United States Patent
Zheng et al.

(10) Patent No.: US 10,782,241 B2
(45) Date of Patent: Sep. 22, 2020

(54) METHOD OF DETERMINING RESIDUAL FLOCCULANT IN EFFLUENT OF AN INDUSTRIAL CLARIFICATION PROCESS

(71) Applicant: Ecolab USA Inc., St. Paul, MN (US)

(72) Inventors: Hua Zheng, Aurora, IL (US); Xiaodong Huang, Aurora, IL (US); Tiandi Zhuang, Bolingbrook, IL (US); Lan Xiao, Naperville, IL (US); Patrick G. Murray, Yorkville, IL (US); Philip M. Eastin, St. Louis, MO (US)

(73) Assignee: Ecolab USA Inc., St. Paul, MN (US)

( * ) Notice: Subject to any disclaimer, the term of this patent is extended or adjusted under 35 U.S.C. 154(b) by 234 days.

(21) Appl. No.: 16/047,229

(22) Filed: Jul. 27, 2018

(65) Prior Publication Data
US 2019/0033222 A1    Jan. 31, 2019

Related U.S. Application Data

(60) Provisional application No. 62/537,551, filed on Jul. 27, 2017.

(51) Int. Cl.
*G01N 21/84* (2006.01)
*G01N 1/28* (2006.01)
(Continued)

(52) U.S. Cl.
CPC ............ *G01N 21/84* (2013.01); *B01D 15/08* (2013.01); *B01D 17/0217* (2013.01);
(Continued)

(58) Field of Classification Search
CPC ............ C02F 1/52; B01D 15/08; G01N 21/78
See application file for complete search history.

(56) References Cited

U.S. PATENT DOCUMENTS

| | | |
|---|---|---|
| 3,420,096 A | 1/1969 | Hoyt |
| 4,386,518 A | 6/1983 | Zatko |

(Continued)

FOREIGN PATENT DOCUMENTS

| | | |
|---|---|---|
| GB | 1321106 A | 6/1973 |
| WO | WO 97/05482 A1 | 2/1997 |
| WO | WO 2016/126149 A2 | 8/2016 |

OTHER PUBLICATIONS

Xiang Xia, "Production and flocculating properties of a compound biopolymer flocculant from corn ethanol wastewater", Oct. 5, 2017 (Year: 2017).*

(Continued)

*Primary Examiner* — Maurice C Smith
(74) *Attorney, Agent, or Firm* — Leydig Voit and Mayer, Ltd.

(57) ABSTRACT

A method of detecting free flocculant polymer having a net charge present in an aqueous phase of a multi-phase substance is provided. The multi-phase substance comprises a solid phase, an organic phase, and the aqueous phase. The method comprises separating the solid phase from the multi-phase substance to form a dual phase top liquid comprising the organic phase and the aqueous phase; separating the organic phase from the dual phase top liquid, leaving the aqueous phase; combining the free flocculant polymer in the aqueous phase and a dye having an opposite net charge than that of the free flocculant polymer, thereby causing a spectroscopically observable change in the aqueous phase; and analyzing the aqueous phase via spectrometry to determine the concentration of the free flocculant polymer in the multi-phase substance.

20 Claims, 1 Drawing Sheet

(51) Int. Cl.
*G01N 21/31* (2006.01)
*C02F 1/52* (2006.01)
*B01D 15/08* (2006.01)
*B01D 17/02* (2006.01)
*G01N 15/06* (2006.01)
*B01D 17/00* (2006.01)
*C02F 1/38* (2006.01)
*C02F 1/44* (2006.01)
*C02F 103/32* (2006.01)
*C02F 1/54* (2006.01)
*C02F 1/24* (2006.01)
*G01N 1/40* (2006.01)
*G01N 21/78* (2006.01)
*G01N 15/00* (2006.01)

(52) U.S. Cl.
CPC ......... *B01D 17/085* (2013.01); *C02F 1/5209* (2013.01); *G01N 1/28* (2013.01); *G01N 15/06* (2013.01); *G01N 21/31* (2013.01); *C02F 1/24* (2013.01); *C02F 1/385* (2013.01); *C02F 1/44* (2013.01); *C02F 1/54* (2013.01); *C02F 2103/32* (2013.01); *C02F 2209/003* (2013.01); *G01N 1/40* (2013.01); *G01N 21/78* (2013.01); *G01N 2015/0053* (2013.01); *G01N 2015/0693* (2013.01); *G01N 2021/8405* (2013.01); *G01N 2021/8411* (2013.01)

(56) References Cited

U.S. PATENT DOCUMENTS

| | | | |
|---|---|---|---|
| 4,532,043 | A | 7/1985 | Prud'homme et al. |
| 4,894,346 | A | 1/1990 | Myers et al. |
| 5,032,526 | A | 7/1991 | Myers et al. |
| 5,389,548 | A | 2/1995 | Hoots et al. |
| 5,413,719 | A | 5/1995 | Sivakumar et al. |
| 5,435,969 | A | 7/1995 | Hoots et al. |
| 5,454,955 | A | 10/1995 | Albrecht et al. |
| 5,798,046 | A | 8/1998 | Greer et al. |
| 6,214,627 | B1 | 4/2001 | Ciota et al. |
| 6,524,486 | B2 | 2/2003 | Borodyanski et al. |
| 6,820,446 | B2 | 11/2004 | Arai et al. |
| 7,497,955 | B2 | 3/2009 | Scheimann et al. |
| 7,601,858 | B2 | 10/2009 | Cantrell et al. |
| 7,608,729 | B2 | 10/2009 | Winsness et al. |
| 8,841,469 | B2 | 9/2014 | Sheppard et al. |
| 8,962,059 | B1 | 2/2015 | Froderman et al. |
| 2002/0039652 | A1* | 4/2002 | Sippel .............. C01F 7/002 428/375 |
| 2005/0268407 | A1 | 12/2005 | Abrams |
| 2006/0006116 | A1 | 1/2006 | Scheimann et al. |
| 2006/0041152 | A1 | 2/2006 | Cantrell et al. |
| 2006/0160227 | A1 | 7/2006 | Sethumadhavan et al. |
| 2006/0193700 | A1 | 8/2006 | Putnam et al. |
| 2006/0194296 | A1 | 8/2006 | Hammond et al. |
| 2011/0272362 | A1 | 11/2011 | Sikes et al. |
| 2012/0125859 | A1 | 5/2012 | Collins et al. |
| 2012/0178171 | A1 | 7/2012 | Chen et al. |
| 2013/0233804 | A1* | 9/2013 | Xie ................ C02F 1/008 210/709 |
| 2015/0041406 | A1* | 2/2015 | Xiao ............... C02F 1/52 210/728 |
| 2015/0260702 | A1 | 9/2015 | Richardson et al. |
| 2016/0146775 | A1 | 5/2016 | Xiao et al. |

OTHER PUBLICATIONS

Zhongming Liu, "Preparation and Application of Phosphorylated Xylan as a Flocculant for Cationic Ethyl Violet Dye", Mar. 14, 2018 (Year: 2018).*
An et al., "Disassembly-driven colorimetric and fluorescent sensor for anionic surfactants in water based on a conjugated polyelectrolyte/dye complex," *Soft Matter*, vol. 7, pp. 6873-6877 (2011).
Beyer, "Effluents in the Metalworking Industry," *Galvanotechnik*, vol. 70, No. 9, pp. 863-878 (Sep. 15, 1979).
Ecolab, "Literature Search Report #10525," 95 pp. (Oct. 12, 2016).
Kadioglu et al., "Surfactant-Based Oil Extraction of Corn Germ," *J. Am. Oil. Chem. Soc.*, vol. 88, pp. 863-869 (2011).
Klinkesorn et al., "Stability and rheology of corn oil-in-water emulsions containing maltodextrin," *Food Research International*, vol. 37, pp. 851-859 (2004).
Nalco Company, "Nalco Active Polymer Test—DR 2800 Analytical Procedure," AP-116/2800, 4 pp. (2008).
Wang et al., "Effect of Low-Shear Extrusion on Corn Fermentation and Oil Partition," *Journal of Agricultural and Food Chemistry*, vol. 57, pp. 2302-2307 (Feb. 20, 2009).
Zhang et al., "Pigment removal in anaerobically digested effluent through polyelectrolyte flocculation and liquid-liquid extraction," *J. Chem. Technol. Biotechnol.*, vol. 87, pp. 1098-1103 (2012).

* cited by examiner

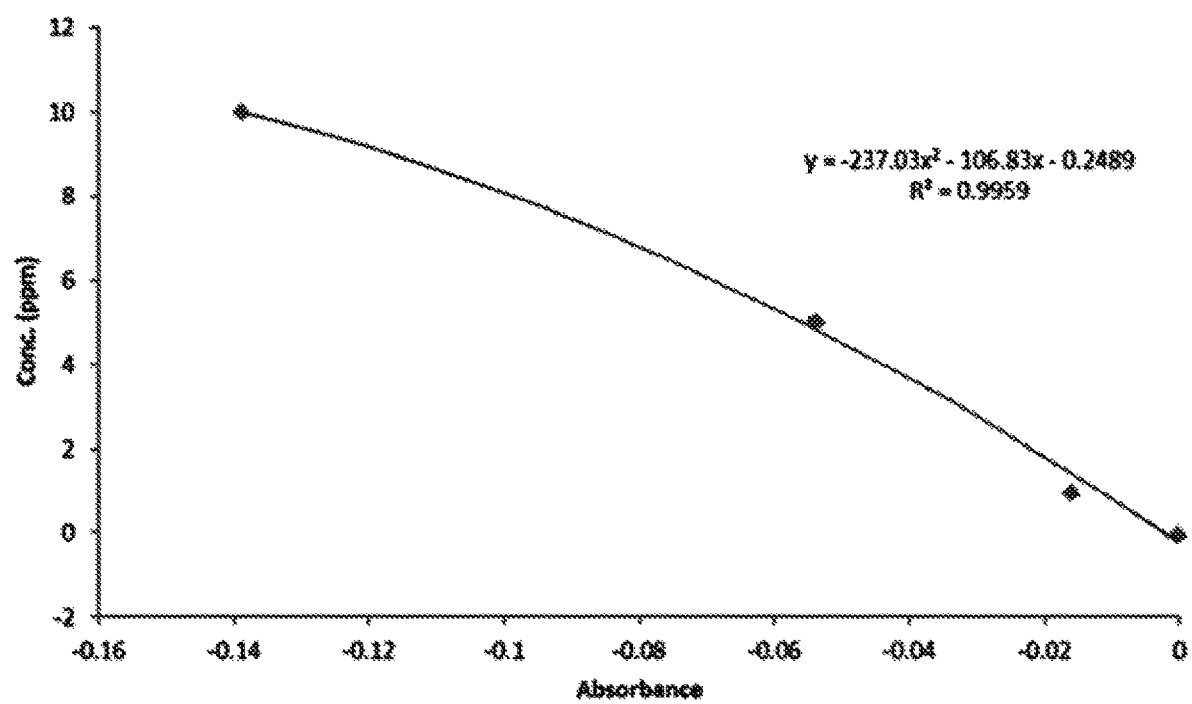

METHOD OF DETERMINING RESIDUAL FLOCCULANT IN EFFLUENT OF AN INDUSTRIAL CLARIFICATION PROCESS

This application is a nonprovisional application claiming the benefit of U.S. Provisional Patent Application Ser. No. 62/537,551, filed Jul. 27, 2017, the disclosure of which is incorporated herein by reference in its entirety.

TECHNICAL FIELD

The disclosure is directed to technologies related to measurement of residual flocculant in effluent of an industrial clarification process.

BACKGROUND OF THE INVENTION

Generally, spectroscopic analysis can be performed on relatively transparent substances to detect various compositions present in the substances. Substances that are opaque tend to cause problems with spectroscopic analysis, as visible light generally cannot penetrate the surface of an opaque substance.

Some industrial processes utilize flocculants having relatively high molecular weights (e.g., having a weight average molecular weight of 1-30 million Daltons) that, if present in a substance (e.g., greater than 1 ppm), then the substance is not suitable for (re)use in an industrial process. Additionally, sometimes the substance that may contain flocculant is opaque, making said substance difficult to detect using spectroscopy.

BRIEF SUMMARY OF THE INVENTION

A method of detecting free flocculant polymer having a net charge present in an aqueous phase of a multi-phase substance is provided. The multi-phase substance comprises a solid phase, an organic phase, and the aqueous phase. The method comprises separating the solid phase from the multi-phase substance to form a dual phase top liquid comprising the organic phase and the aqueous phase; separating the organic phase from the dual phase top liquid, leaving the aqueous phase; combining the free flocculant polymer in the aqueous phase and a dye having an opposite net charge than that of the free flocculant polymer, thereby causing a spectroscopically observable change in the aqueous phase; and analyzing the aqueous phase via spectrometry to determine the concentration of the free flocculant polymer in the multi-phase substance.

BRIEF DESCRIPTION OF THE FIGURES

FIG. 1 graphically illustrates results of Example 1, which is a calibration plot of concentration of flocculant polymer in water versus absorbance.

DETAILED DESCRIPTION OF THE INVENTION

A method of detecting free flocculant polymer having a net charge present in an aqueous phase of a multi-phase substance is provided. The multi-phase substance comprises a solid phase, an organic phase, and the aqueous phase. The method comprises separating the solid phase from the multi-phase substance to form a dual phase top liquid comprising the organic phase and the aqueous phase; separating the organic phase from the dual phase top liquid, leaving the aqueous phase; combining the free flocculant polymer in the aqueous phase and a dye having an opposite net charge than that of the free flocculant polymer, thereby causing a spectroscopically observable change in the aqueous phase; and analyzing the aqueous phase via spectrometry to determine the concentration of the free flocculant polymer in the multi-phase substance.

In embodiments of the methods provided herein, for purposes of this disclosure, a "multi-phase substance" comprises at least three phases: a solid phase, an organic phase, and an aqueous phase. In certain embodiments of the methods provided herein, the multi-phase substance is underflow from a solid-liquid separation operation, which may be selected from a clarification system, an air flotation system (e.g., a dissolved air flotation system), a centrifuge, a filter, multiples thereof, and combinations thereof. In certain embodiments, the multi-phase substance is underflow from an air flotation system (e.g., a dissolved air flotation system).

Though the methods provided herein can be utilized in any of several processes where free flocculant polymer may be present in an aqueous phase of any suitable multi-phase substance, the methods provided herein provide particular utility in certain corn to ethanol processing systems. In certain embodiments of the methods provided herein, the multi-phase substance comprises thin stillage of a corn to ethanol process.

In embodiments of the methods provided herein, the multi-phase substance comprises a solid phase. The solid phase may comprise, e.g., particulates that are not separated from a flocculation system, e.g., an air flotation system. In certain embodiments of the methods provided herein, the solid phase comprises, for example, one or more of solids, fat, oil, grease, microorganisms, fiber, extracellular polymer substances (e.g., unfermented carbohydrates), ash, or combinations thereof. In certain embodiments of the methods provided herein, when utilized in a corn to ethanol process, the solid phase may comprise, e.g., fiber, microorganisms, extracellular polymer substances (e.g., unfermented carbohydrates), and/or ash. Generally, the solid phase may comprise from about 5 to about 50% by volume of the multi-phase substance.

In embodiments of the methods provided herein, the multi-phase substance comprises an organic phase. The organic phase may comprise, e.g., organic liquid that may or may not have value to the entity performing a method provided herein. In certain embodiments of the methods provided herein, the organic phase comprises, for example, one or more fat, oil, protein, polysaccharide, and combinations thereof. In certain embodiments of the methods provided herein, when utilized in a corn to ethanol process, the organic phase may comprise, e.g., fat, oil, protein, and polysaccharide. The organic phase may comprise from about 1 to about 10% by volume of the multi-phase substance.

In embodiments of the methods provided herein, the multi-phase substance comprises an aqueous phase. The aqueous phase comprises water and, when present, free flocculant polymer, which is the target of the detection methods described herein. In addition to water and free flocculant polymer, the aqueous phase may further comprise, e.g., alcohol, sugar, starch, protein, fat, phosphorus, salt, and combinations thereof. In certain embodiments of the methods provided herein, when utilized in a corn to ethanol process, in addition to water and free flocculant polymer, the aqueous phase may further comprise, e.g., alcohol, sugar, starch, salt, and combinations thereof. The aqueous phase may comprise from about 50 to about 90% by volume of the multi-phase substance.

As can be seen herein, certain components may be present in the solid phase and/or the organic phase and/or the aqueous phase. For example, certain components, such as fat, oil, and polysaccharide, may be present in either the solid phase, the organic phase, the aqueous phase, or some combination of two or all three of the phases. Factors that affect the presence of the certain components in either of the phases include, but are not limited to, polarity, hydrophobicity, and size of the components.

As described herein, free flocculant polymer may be present in the aqueous phase of the multi-phase system. Should unacceptable amounts of free flocculant polymer be present in the aqueous phase, the water present in the aqueous phase may not be suitable for certain purposes of utilization, e.g., as a feed stream for industrial processes. Ideally, no free flocculant polymer will be present in the aqueous phase; however, some minimal amount may be able to be tolerated depending on the purpose of utilization.

Generally, flocculant polymer is utilized as an agglomerant for separation purposes (e.g., as a filter aid, settling aid, and/or flotation aid). If dosed in an excess amount, free flocculant polymer may be present in an aqueous phase downstream of a separation operation. Thus, for purposes of this disclosure, "free flocculant polymer" is flocculant polymer that is present in an aqueous phase downstream of a separation operation. In certain embodiments of the methods provided herein, the separation operation is a clarification operation, which in certain embodiments is selected from air flotation (e.g., dissolved air flotation), settling, filtration (e.g., filter press, belt press, etc.), centrifugation, and combinations thereof. In certain embodiments of the methods provided herein, the free flocculant polymer was manufactured via inverse emulsion polymerization. In certain embodiments of the methods provided herein, the free flocculant polymer is present in an aqueous phase of an oil-in-water emulsion.

The free flocculant polymer present in the aqueous phase of the multi-phase substance may be any suitable flocculant polymer utilized in a separation operation. For example, the free flocculant polymer may be of a relatively high molecular weight (e.g., from about 500,000 Daltons to about 50,000,000 Daltons). In embodiments of the methods provided herein, the free flocculant polymer has a net charge (e.g., anionic or cationic). Generally, the free flocculant polymer present in the aqueous phase of the multi-phase substance is of anionic charge, though cationic charge may be utilized as well.

In certain embodiments of the methods provided herein, the free flocculant polymer comprises a (meth)acrylamide monomer unit. The term "(meth)acrylamide" is used to describe an acrylamide monomer unit, a methacrylamide monomer unit, or combinations of both an acrylamide monomer unit and a methacrylamide monomer unit, with the same rule applying to similarly-named monomer units. In certain embodiments of the methods provided herein, the free flocculant polymer further comprises a monomer unit selected from carboxylate, sulfonate, and combinations thereof. Examples of carboxylate monomer units include, but are not limited to, (meth)acrylic acid, maleic acid, itaconic acid, vinylacetic acid, allyl acetic acid, fumaric acid, phosphinocarboxylic acid, and combinations thereof. The combinations of monomer units in the free flocculant polymer may be of any suitable combination, so long as the monomer units provide a net charge as described herein. In certain embodiments, the free flocculant polymer comprises (meth)acrylamide monomer units and (meth)acrylic acid monomer units.

In embodiments of the methods provided herein, the free flocculant polymer, when present, is detected using the method. The term "detecting" is meant to describe acts of qualitative as well as quantitative detection of the presence of free flocculant polymer, though any particular method may be more specific in nature (e.g., qualitative determination of the presence versus, e.g., quantitative determination of the concentration in the multi-phase substance). For example, the phrase "to determine the concentration of the free flocculant in the multi-phase substance" is meant to describe any concentration determination of the free flocculant present in, e.g., the multi-phase substance, the aqueous phase, or any substituent of the multi-phase substance that can be readily determined from the multi-phase substance. An example of a substituent of the multi-phase substance is the liquid portion of the multi-phase substance (i.e., the organic phase plus the aqueous phase), which is also described herein as a dual phase top liquid.

In embodiments of the methods provided herein, the solid phase is separated from the multi-phase substance to form a dual phase top liquid comprising the organic phase and the aqueous phase. In certain embodiments of the methods provided herein, the solid phase is separated from the multi-phase substance by subjecting the multi-phase substance to centrifugation and/or membrane filtration. Generally, whether centrifugation, membrane filtration, or both centrifugation and membrane filtration are utilized will depend upon several factors, which may include but is not limited to, one or more of the type of solids present in the solid phase, the amount of solids present in the solid phase, the density of the solid phase, and other factors.

In embodiments of the methods provided herein, the term "dual phase top liquid" is used to describe the organic phase and the aqueous phase, particularly after the solid phase has been separated from the multi-phase substance. Generally, the dual phase top liquid comprises from about 1 to about 10% by volume of the multi-phase substance.

In embodiments of the methods provided herein, the organic phase is separated from the dual phase top liquid, leaving the aqueous phase, which can be carried out by subjecting the dual phase top liquid to centrifugation, membrane filtration, and/or another suitable separation procedure. Certain embodiments of the methods described hereinfurther comprise subjecting the dual phase top liquid to flash chromatography or an extraction cartridge. Generally, an extraction cartridge may be utilized to remove color from the aqueous phase. If present, color in the aqueous phase may hinder analysis of the aqueous phase. An example of an extraction cartridge is a Waters Sep Pak silica cartridge, available from Waters Corporation, 34 Maple Street, Milford, Mass. 01757, USA. Extraction cartridges can be used to separate complex matrices based on polarity of the compositions in a substance (e.g., a dual phase top liquid). An exemplary extraction cartridge contains silica particles that are capable of selectively adsorb or retain certain components and not retain other components. For the methods described herein, when utilized, components that cause color in a dual phase top liquid, or phase thereof (e.g., aqueous phase), are retained by the cartridge, which results in an aqueous phase that can be spectroscopically analyzed.

In embodiments of the methods provided herein, the aqueous phase and a dye having an opposite net charge than that of the free flocculant polymer are combined, thereby causing a spectroscopically observable change in the aqueous phase. The combining may be achieved by any suitable method of combining substances. For example, the dye having an opposite net charge than that of the free flocculant polymer may be hand-delivered into the aqueous phase and mixed via any suitable method of mixing (e.g., shaking, stirring, etc.). The combining results in the dye coming into contact with free flocculant that may be present in the aqueous phase to cause a spectroscopically observable change in the aqueous phase.

The term "spectroscopically observable change" is used herein to describe a spectroscopic property of the aqueous phase that, because of the combining of the dye and the aqueous phase comprising free flocculant polymer, changes, the change of which can be detected via a spectrometry device. Examples of spectroscopic properties include, but are not limited to, absorbance, color intensity, and the like. Examples of spectrometry devices include, but are not limited to, a UV/Visible spectrometer, a colorimeter, and the like. Thus, the spectroscopically observable change in the aqueous phase can be analyzed via spectrometry to determine the concentration of the free flocculant in the multi-phase sub stance.

The dye may be any suitable dye having an opposite net charge than that of the free flocculant polymer. For example, when the free flocculant polymer has a net anionic charge, the dye has a net cationic charge, and vice versa. In certain embodiments of the methods provided herein, the free flocculant polymer has a net anionic charge, and the dye has a net cationic charge. In certain embodiments of the methods provided herein, the dye has a net cationic charge and may be selected from crystal violet, methyl green, malachite green, acridine orange, paraosaniline, Nile Blue A, 1,9-dimethyl methylene blue, basic blue 17, new methylene blue N, pinacyanol chloride, neutral red, safrin O, methylene blue, methyl red, quinalizarin, tetrachrome, brilliant blue G, and mordant black II. In certain embodiments of the methods provided herein, the dye is Nile Blue A.

After performing the analyzing, the method may further comprise additional steps. In certain embodiments of the methods provided herein, if the aqueous phase comprises an acceptable concentration of free flocculant polymer, then the multi-phase substance, the dual phase top liquid, and/or the aqueous phase is directed to an industrial process. An acceptable concentration depends upon the intended use of the aqueous phase. For example, in certain embodiments of the methods provided herein, the aqueous phase should be free of any flocculant polymer. In other embodiments, some amount of free flocculant polymer in the aqueous phase can be tolerated (e.g., less than about 1 ppm). Thus, certain embodiments of the methods provided herein further comprise determining whether the concentration of the free flocculant polymer in the multi-phase substance exceeds a pre-determined concentration limit.

As described herein, the methods provided herein can be particularly useful in corn to ethanol processing. In certain embodiments of the methods provided herein, wherein the multi-phase substance comprises underflow from an air flotation device utilized in a corn to ethanol process, if the free flocculant polymer present in the multi-phase substance does not exceed the pre-determined concentration limit, then recycling the multi-phase substance and/or the dual phase top liquid into the corn to ethanol process, and if the free flocculant polymer present in the multi-phase substance exceeds a pre-determined concentration limit, then ceasing to recycle the multi-phase substance and/or the dual phase top liquid into the corn to ethanol process.

The following examples further illustrate the invention but, of course, should not be construed as in any way limiting its scope.

EXAMPLES

The following or similar materials were utilized in performing the following examples:
Nalco DR 2800 Spectrophotometer, Nalco DR 1900 Spectrophotometer, or equivalent
25 mL round glass sample cells
1,000 µL (1 mL) pipettor and pipet tips
Flocculant polymer: Latex emulsion polymer with weight average molecular weight of from 2 million to 50 million daltons, 25% by volume actives in water
Dye solution: 0.012 g Nile Blue A in 1 L of water with pH adjusted to about 7
Disposable syringe
Syringe filters
Centrifugal filters Example 1

This example demonstrates the generation of a calibration curve in water. A stock standard solution of the flocculant polymer was obtained by weighing 0.04 g of the flocculant polymer and diluting with water (e.g., distilled water or deionized water) to 100 mL. The solution was slightly cloudy. Volume-to-volume dilutions of the stock standard solution were obtained.

The spectrophotometer was set for an absorbance reading at 635 nm and zeroed using air.

25 mL of dye solution was added to a round glass sample cell. 1 mL of deionized water was added to the dye solution in the round glass sample cell via pipet with swirling for about 30 seconds. The round glass sample cell was placed in the spectrophotometer and the absorbance was measured. The value was greater than 1, and the spectrophotometer was "zeroed" using this sample. Absorbances of the various dilutions of the stock standard solutions in combination with the dye solution were obtained and plotted as shown in FIG. 1. Absorbance of the dye-polymer complex in water decreases with increasing concentration of the flocculant polymer, as shown in FIG. 1. This is normal and indicative of complex formation between the flocculant polymer and the dye.

Example 2

This example demonstrates performance of at least one of the methods provided herein to detect free flocculant polymer having a net charge present in an aqueous phase of a multi-phase substance, which in this instance was corn stillage. 25-30 mL of corn stillage was centrifuged at 3000 rpm for 30 minutes. An aqueous layer was separated, which was decanted to a second centrifuge tube and centrifuged at 3000 rpm for 30 minutes. The aqueous layer from the second centrifuge was transferred to a third centrifuge tube. The aqueous layer present in the third centrifuge tube was subjected to sequential membrane filtration of 5-µm, 0.45-µm, and 0.22-µm, respectively, syringe filters. A clear aqueous layer (e.g., an aqueous layer that was visibly clear in appearance to the human eye) was obtained.

15 mL of the clear aqueous layer was transferred to an Amicon Ultra 15-mL centrifugal filter having a molecular weight cut-off of 3000 daltons (available from Millipore), centrifuged at 3000 rpm until the sample is reduced in size to 1.5 mL. The 1.5-mL sample was then subjected to membrane filtration using a 0.22-µm syringe filter.

Example 3

This example demonstrates color removal of corn stillage. Using a Sep Pak cartridge from Waters Corporation, approximately 10 mL of methanol was used to rinse the cartridge with a disposable syringe. The syringe was removed from the cartridge, and the syringe was filled with deionized water. The syringe was reconnected to the cartridge, and the deionized water was delivered to the cartridge to remove the methanol. The syringe was removed from the cartridge, filled with air, reattached to the cartridge, and the air was delivered to the cartridge to remove the deionized water as much as reasonably possible.

The syringe was removed from the cartridge and filled with an amount of clear aqueous layer from Example 2 was placed in the syringe. The syringe was reattached to the cartridge, and the clear aqueous layer in the syringe was delivered to the cartridge slowly but evenly (e.g., one drop at a time). After delivering the clear aqueous layer present in the syringe to the cartridge, the syringe was detached, filled with air, reattached, and the air was delivered to the cartridge to displace the clear aqueous layer. After the clear aqueous layer is recovered from the cartridge, it can be tested using the calibration curve of Example 1.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of detecting free flocculant polymer having a net charge present in an aqueous phase of a multi-phase substance comprising a solid phase, an organic phase, and the aqueous phase, the method comprising:
    separating the solid phase from the multi-phase substance to form a dual phase top liquid comprising the organic phase and the aqueous phase;
    separating the organic phase from the dual phase top liquid, leaving the aqueous phase;
    combining the aqueous phase and a dye having an opposite net charge than that of the free flocculant polymer, thereby causing a spectroscopically observable change in the aqueous phase; and
    analyzing the spectroscopically observable change in the aqueous phase via spectrometry to determine the concentration of the free flocculant in the multi-phase substance.

2. The method of claim 1, wherein, if the aqueous phase comprises an acceptable concentration of free flocculant polymer, then directing the multi-phase substance to an industrial process.

3. The method of claim 1, wherein the multi-phase substance is underflow from a clarification operation.

4. The method of claim 3, wherein the clarification operation is selected from an air flotation system, a centrifuge, a filter, multiples thereof, and combinations thereof.

5. The method of claim 1, wherein the multi-phase substance is underflow from an air flotation system.

6. The method of claim 1, wherein the multi-phase substance comprises thin stillage of a corn to ethanol process.

7. The method of claim 6, further comprising determining whether the concentration of the free flocculant polymer in the multi-phase substance exceeds a pre-determined concentration limit.

8. The method of claim 7, wherein, if the free flocculant polymer present in the multi-phase substance does not exceed the pre-determined concentration limit, then recycling the multi-phase substance into the corn to ethanol process, and if the free flocculant polymer present in the multi-phase substance exceeds a pre-determined concentration limit, then ceasing to recycle the multi-phase substance into the corn to ethanol process.

9. The method of claim 1, wherein the solid phase and/or organic phase is separated from the multi-phase substance by subjecting the multi-phase substance to centrifugation or membrane filtration.

10. The method of claim 1, further comprising subjecting the dual phase top liquid to flash chromatography or an extraction cartridge.

11. The method of any claim 1, wherein the free flocculant polymer has a molecular weight of from about 500,000 Daltons to about 50,000,000 Daltons.

12. The method of claim 1, wherein the free flocculant polymer has anionic net charge and the dye has cationic opposite net charge.

13. The method of claim 1, wherein the free flocculant polymer comprises (meth)acrylamide monomer units.

14. The method of claim 13, wherein the free flocculant polymer further comprises a monomer unit selected from carboxylate, sulfonate, and combinations thereof.

15. The method of claim 13, wherein the free flocculant polymer comprises a carboxylate monomer unit.

16. The method of claim 15, wherein the carboxylate monomer unit is selected from acrylic acid, methacrylic acid, maleic acid, itaconic acid, vinylacetic acid, allyl acetic acid, fumaric acid, phosphinocarboxylic acid, and combinations thereof.

17. The method of claim 13, wherein the free flocculant polymer further comprises a (meth)acrylic acid monomer unit.

18. The method of claim 1, wherein the dye is selected from crystal violet, methyl green, malachite green, acridine orange, paraosaniline, Nile Blue A, 1,9-dimethyl methylene blue, basic blue 17, new methylene blue N, pinacyanol chloride, neutral red, safrin O, methylene blue, methyl red, quinalizarin, tetrachrome, brilliant blue G, and mordant black II.

19. The method of claim 1, wherein the dye is Nile Blue A.

20. The method of claim 13, wherein the dye is Nile Blue A.

* * * * *

UNITED STATES PATENT AND TRADEMARK OFFICE
CERTIFICATE OF CORRECTION

PATENT NO. : 10,782,241 B2
APPLICATION NO. : 16/047229
DATED : September 22, 2020
INVENTOR(S) : Hua Zheng et al.

Page 1 of 1

It is certified that error appears in the above-identified patent and that said Letters Patent is hereby corrected as shown below:

In the Claims

In Column 8, Line 50, Claim 11 delete "of any claim" and insert --of claim--

In Column 9, Line 6, Claim 18 delete "paraosaniline," and insert --pararosaniline,--

In Column 9, Line 8, Claim 18 delete "safrin" and insert --safrinin--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*